United States Patent
Pearson et al.

(10) Patent No.: US 10,876,661 B2
(45) Date of Patent: Dec. 29, 2020

(54) PREFORMED DUCT ASSEMBLY

(71) Applicant: Forterra Pipe & Precast, LLC, Irving, TX (US)

(72) Inventors: Matthew Pearson, Minneapolis, MN (US); Fred Larson, Granger, IA (US)

(73) Assignee: Forterra Pipe & Precast, LLC, Irving, TX (US)

( * ) Notice: Subject to any disclaimer, the term of this patent is extended or adjusted under 35 U.S.C. 154(b) by 570 days.

(21) Appl. No.: 15/486,491

(22) Filed: Apr. 13, 2017

(65) Prior Publication Data

US 2017/0299090 A1 Oct. 19, 2017

Related U.S. Application Data

(60) Provisional application No. 62/322,451, filed on Apr. 14, 2016.

(51) Int. Cl.
| | |
|---|---|
| *F16L 37/56* | (2006.01) |
| *F16L 9/19* | (2006.01) |
| *E02D 29/00* | (2006.01) |
| *H02G 3/04* | (2006.01) |
| *F16L 37/084* | (2006.01) |
| *H02G 9/04* | (2006.01) |
| *H02G 9/06* | (2006.01) |
| *F16L 9/12* | (2006.01) |

(52) U.S. Cl.
CPC ............... *F16L 9/20* (2013.01); *E02D 29/00* (2013.01); *F16L 37/084* (2013.01); *F16L 37/56* (2013.01); *H02G 3/0406* (2013.01); *H02G 3/0487* (2013.01); *H02G 9/04* (2013.01); *H02G 9/06* (2013.01); *F16L 9/12* (2013.01)

(58) Field of Classification Search
CPC ........ F16L 37/56; E02D 29/00; H02G 3/0487
USPC ........................ 285/230, 124.1, 124.2, 124.5
See application file for complete search history.

(56) References Cited

U.S. PATENT DOCUMENTS

| | | | | |
|---|---|---|---|---|
| 245,285 A | * | 8/1881 | Detrick | F16L 11/127 174/47 |
| 388,442 A | * | 8/1888 | Phipps | F16L 39/00 285/124.5 |
| 530,951 A | * | 12/1894 | Pointe et al. | F16L 5/06 285/124.5 |
| 733,631 A | * | 7/1903 | Devonshire | F16L 13/113 285/124.1 |
| 801,774 A | * | 10/1905 | Devpnshire | F16L 13/113 285/124.1 |

(Continued)

OTHER PUBLICATIONS

Nominal Pipe Size (NPS), definition from Wikipedia; https://web/archive.org/web20111004013625/https://en.wikipedia.org/wiki/Nominal_Pipe_size: printed Nov. 15, 2019; 6 pages.

(Continued)

*Primary Examiner* — David Bochna
(74) *Attorney, Agent, or Firm* — Baker Botts L.L.P.

(57) ABSTRACT

A duct bank assembly may include an elongate extending conduit with a length for receiving and passing through a cable or wire and an encasing body encasing the conduit along its longitudinal extent between a first mating end and an opposed second mating end of the body. Each mating end of the at least one elongate conduit has a male or female mating end for joining with a corresponding male or female mating end of an abutting duct bank assembly in a self-locking, self-sealing joint.

29 Claims, 19 Drawing Sheets

(56) References Cited

U.S. PATENT DOCUMENTS

| | | | | |
|---|---|---|---|---|
| 1,520,840 | A * | 12/1924 | Murray | B28B 21/88 138/105 |
| 1,525,087 | A * | 2/1925 | Murray | F16L 1/038 138/105 |
| 1,666,799 | A * | 4/1928 | Trammell | F16L 13/124 285/423 |
| 1,744,102 | A | 1/1930 | Burke | |
| 1,761,075 | A * | 6/1930 | Gest | H02G 3/0481 138/105 |
| 1,795,884 | A | 3/1931 | Parker | |
| 1,899,861 | A * | 2/1933 | Gackenbach | H02G 9/06 285/124.5 |
| 2,658,378 | A | 11/1953 | Fiordelisi | |
| 3,163,448 | A * | 12/1964 | Franklin | F16L 21/002 285/230 |
| 3,212,797 | A * | 10/1965 | Osweiler | F16L 21/08 285/230 |
| 3,498,645 | A * | 3/1970 | Danko | F16L 25/0027 285/230 |
| 3,574,356 | A * | 4/1971 | Salerno | H02G 9/06 285/39 |
| 3,606,395 | A * | 9/1971 | Salerno et al. | F16L 39/00 285/124.5 |
| 3,711,127 | A * | 1/1973 | Raffa | F16L 37/56 285/124.5 |
| 3,729,939 | A * | 5/1973 | Shimizu | E02B 3/16 285/230 |
| 3,767,232 | A * | 10/1973 | Smith | F16L 9/18 285/230 |
| 3,774,944 | A * | 11/1973 | Slaton | F16L 39/00 285/230 |
| 3,792,878 | A * | 2/1974 | Freeman | F16L 37/12 285/124.5 |
| 3,822,903 | A * | 7/1974 | McNeely | F16L 39/00 285/124.2 |
| 3,872,894 | A * | 3/1975 | Streit | F16L 37/56 138/155 |
| 3,873,134 | A * | 3/1975 | Sammaritano | F16L 39/00 285/123.2 |
| 3,977,703 | A * | 8/1976 | Curtis | F16L 37/56 285/150.1 |
| 4,002,358 | A * | 1/1977 | Streit | F16L 37/56 285/124.5 |
| 5,137,306 | A * | 8/1992 | Flood | F16L 39/04 285/123.2 |
| RE34,978 | E * | 6/1995 | Adams | F16L 39/00 285/124.1 |
| 5,605,419 | A * | 2/1997 | Reinert, Sr. | F16L 3/22 138/113 |
| 5,827,441 | A | 10/1998 | Solbjörg | |
| 6,039,359 | A * | 3/2000 | Valenziano | F16L 21/002 285/230 |
| 6,672,627 | B1 * | 1/2004 | Mariman | F16L 5/00 285/124.1 |
| 7,097,211 | B2 | 8/2006 | Adams | |
| 7,845,686 | B2 | 12/2010 | Steinbruck | |
| 7,942,371 | B1 | 5/2011 | McCoy | |
| 8,689,502 | B2 | 4/2014 | Langguth et al. | |
| 2004/0174015 | A1 * | 9/2004 | Deremiah | G01M 3/2853 285/230 |

OTHER PUBLICATIONS

Underground Spacer System, Product Catalog/TVC, https://web.archive.org/web/20171229234048/htp://ww.tvcinc.com/innerduct-conduit/underground-spacer-system/; printed Nov. 15, 2019; 2 pages.

* cited by examiner

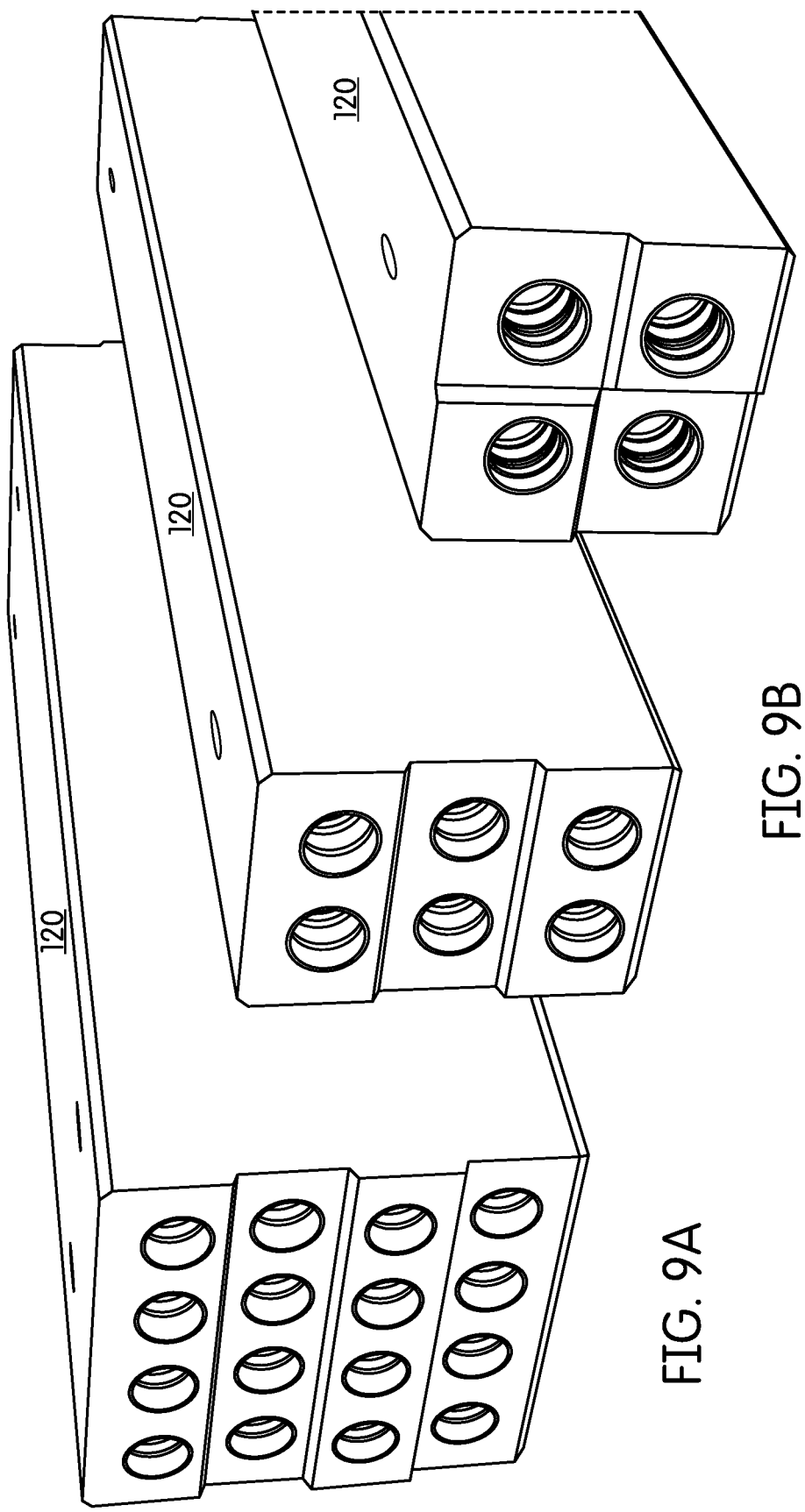

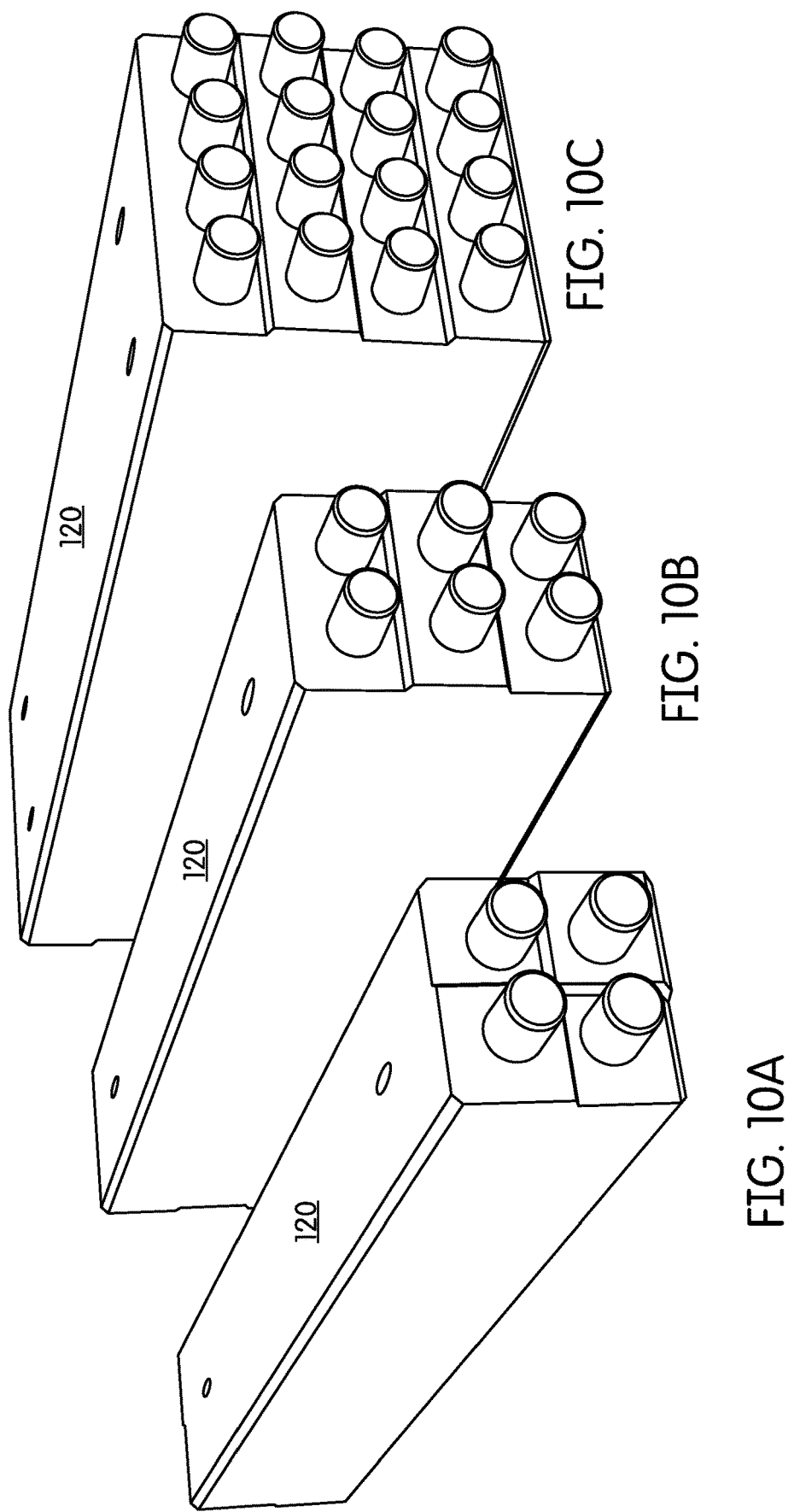

PREFORMED DUCT ASSEMBLY

CROSS-REFERENCE TO RELATED APPLICATION

This application claims the benefit of priority to provisional application Ser. No. 62/322,451 filed Apr. 14, 2016, which is incorporated herein by reference in its entirety.

FIELD OF THE DISCLOSURE

The present disclosure relates generally to an apparatus for passing through of wires, communication lines, information lines, power lines, electrical lines, fluids, or any elongated or flowing materials or devices suitable for such passage. Such apparatus may, in various embodiments, comprise a conduit, pipe, pipe sleeve, duct, or other hollow element. The disclosure further relates to systems or assemblies using such apparatus and to methods of making and using the apparatus. More particularly, the present disclosure relates to conduits, or any of the other devices listed, that are encased in an encasing material. Still more particularly, the present disclosure relates to concrete encased duct banks for passing through of electrical and/or communication lines.

BACKGROUND

When running electrical or communication lines underground, these lines are often passed through conduits or pipes to help protect the lines from electrical short, fire, explosion, or deterioration or damage due to moisture, rodents, human activity such as digging, shifts in surrounding dirt, gravel or other granular fill and other adverse conditions or activities. In some cases, the pipes may be arranged in an excavation and may further be encased in cast-in-place concrete. That is, an assembly of pipes may be placed in an excavation, formwork may be placed around the assembly of pipes, and cast-in-place concrete may be poured into the formwork to encase the pipes, allowing for electrical or communication lines to be run through the encased pipes.

This cast-in-place approach often results in delays in the construction of facilities, due to the need to arrange and wait for the delivery of concrete to the project site. The assembly of pipes may be disturbed between the time of their placement and the concrete pour. If not well-anchored, the pipe assembly may be disturbed by the pour, or poured concrete may enter and occlude the interior of a pipe. In some situations, relatively expensive pump trucks may be required to reach the locations where the cast-in-place concrete is to be placed. Moreover, once the concrete has been placed, the concrete may need to be allowed to cure to reach a specified strength prior to backfilling an excavation, causing further delay. Waiting for concrete test results may also delay the backfilling of an excavation and create additional down time for the contractor.

SUMMARY

In some embodiments, a duct bank assembly including an elongate conduit having a length for receiving and passing through a cable or wire is provided. Generally, the conduit may be oriented horizontally but in certain applications, the conduit may be oriented vertically or at some angle in between. The assembly may also include an encasing body substantially encasing the conduit for all or part of the length. The encasing body may encase the conduit along its longitudinal extent between a first mating end and an opposed second mating end of the body. Each end of the at least one elongate conduit is provided with a male or female mating end for joining with a corresponding male or female mating end of a corresponding conduit of an abutting duct bank assembly in a self-locking, self-sealing joint.

In one embodiment, the at least one elongate conduit comprises at least one means for resisting relative motion between the conduit and the encasing body resulting from differential loading between the conduit and the encasing body.

In another embodiment, each mating end has a shear transfer mechanism associated therewith for engagement with a corresponding shear transfer mechanism of an adjacent duct bank assembly.

In a further embodiment, a duct bank assembly comprises at least one elongate conduit with a length for receiving and passing through a service delivery media; and an encasing body encasing the conduit along its longitudinal extent between a first mating end and an opposed, second mating end of the body. Each end of the at least one elongate conduit is provided with a male or female mating end for joining with a corresponding male or female mating end of a corresponding conduit of an abutting duct bank assembly in a self-locking, self-sealing joint. Each mating end may further be provided with a shear transfer mechanism associated therewith for engagement with a corresponding shear transfer mechanism of an adjacent duct bank assembly. A method of making a duct bank assembly, comprises providing at least one elongate conduit with a length for receiving and passing through a service delivery media; supporting the conduit at a position suitable for its encasement in the assembly; and forming an encasing body encasing the conduit along its longitudinal extent between a first mating end and an opposed second mating end of the body, including providing at each end of the at least one elongate conduit a male or female mating end for joining with a corresponding male or female mating end of a corresponding conduit of an abutting duct bank assembly in a self-locking, self-sealing joint. Further, each mating end may be provided with a shear transfer mechanism associated therewith for engagement with a corresponding shear transfer mechanism of an adjacent duct bank assembly.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIGS. 9A, 9B, and 9C are end perspective views of duct bank assemblies according to certain embodiments showing alternative shear transfer mechanisms on the female mating end.

FIGS. 10A, 10B, and 10C are end perspective views of duct bank assemblies according to certain embodiments showing alternative shear transfer mechanisms on the male mating end.

DETAILED DESCRIPTION

Figure 1:
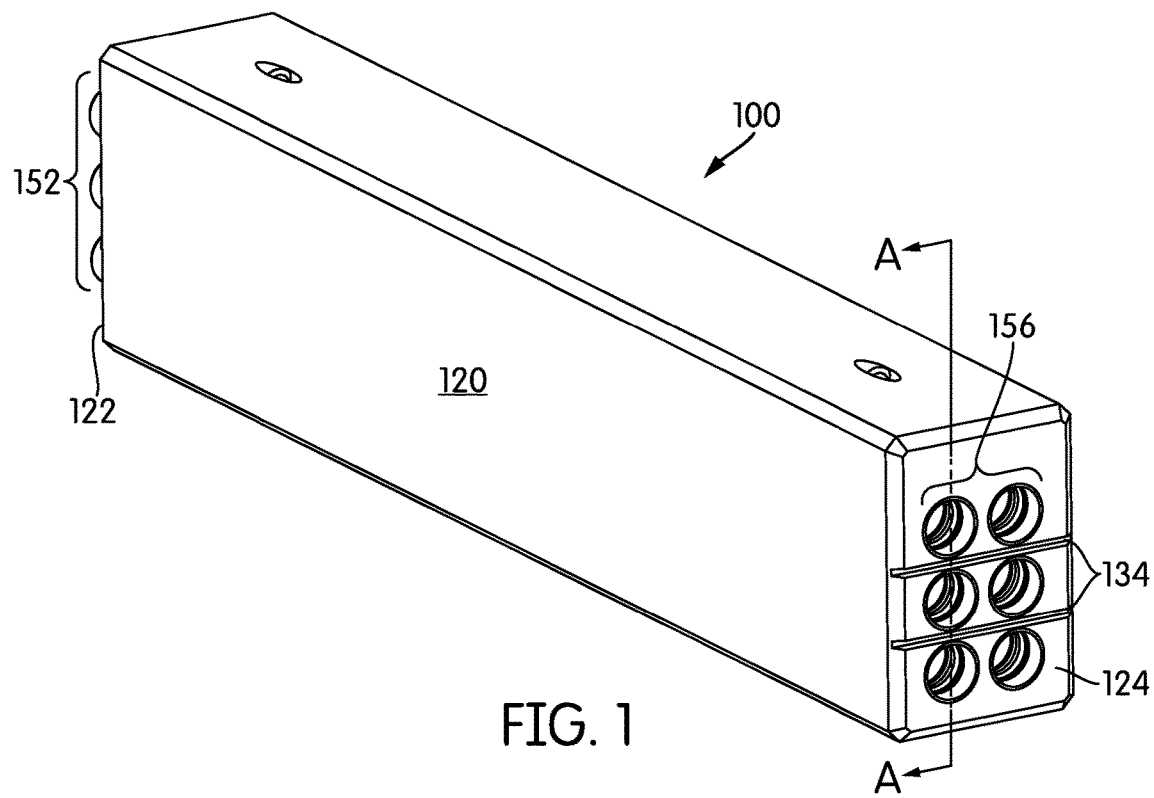
FIG. 1 is perspective view of a preformed duct bank assembly according to certain embodiments.

The present disclosure relates generally to an apparatus for passing through of wires, communication lines, information lines, power lines, electrical lines, rigid or flexible pipes, or any elongated materials or service delivery media or fluids suitable for such passage. Such apparatus may, in various embodiments, comprise at least one conduit, pipe, pipe sleeve, duct, or other hollow element defining a passage. The conduit, pipe, etc. of the apparatus may be encased in an encasing material, such as precast concrete for example, to form a concrete encased duct bank assembly for passing through of electrical and/or communication lines. The duct bank assemblies may be formed in controlled conditions in a plant and later shipped to a project site for placement in an excavation. A plurality of duct bank assemblies may be placed in series with one another, with a mating end of one assembly in mating relationship with a mating end of an adjacent assembly. Each end of the at least one elongate conduit is provided with a male or female mating end for joining with a corresponding male or female mating end of the corresponding conduit of the abutting duct bank assembly in a self-locking, self-sealing joint. The at least one elongate conduit also is provided with at least one means for resisting relative motion between the conduit and the encasing body resulting from differential loading between the conduit and the encasing body. At each mating end a shear transfer mechanism may be provided to allow the individual assemblies to engage one another and resist relative displacement of the adjacent assemblies. The assemblies may offer passages for and protection to the lines, materials or devices positioned therein against potentially harmful conditions and activities in and around the assemblies.

FIGS. 1-7 illustrate various embodiments and portions of duct bank assemblies 100. FIGS. 2, 7B, 12A, and 13A illustrate a shear key 132 provided on a duct bank assembly and FIGS. 2 and 4-6 illustrate a duct spacer 170 of a duct bank assembly 100. The description provided below corresponds generally to the figures. By way of a non-limiting example, an embodiment suitable for providing one or more passages for one or more electrical power or electrical or optical communication lines will be described.

Pipes/Conduits and Encasing

The present disclosure, in one embodiment, relates to duct bank assemblies 100 for electrical lines. The duct bank assemblies 100 may comprise precast concrete structures, referred to as encasements, encasing elements, or encasing bodies 120, that have encased pipes or conduits 150 running therethrough to form elongated passages 110a, 110b, 110c (see FIGS. 2, 5, and &B). In one embodiment, the pipes 150 may be PVC pipes with a wall thickness suitable for concrete encasement, such as schedule 40, 80, or other grades, and may be single or arranged in an array within the encasement 120. The pipes may be NPS 2",3", 4",5", or 6" diameter pipes, or other diameters may be used.

The pipes 150 may be supported and held in place during casting with pipe or duct spacers 170 (see FIGS. 2, 4, 5, and 6). The American Concrete Institute guidelines may be followed for purposes of concrete cover. For example, exterior cover of three inches may be predetermined for the design of an assembly and provided from the outermost surface of the pipes to the outer or exposed surface of the concrete. Lesser or additional concrete cover over and around the pipes may be provided, as predetermined and controlled by spacers supporting them, depending on application. The pipes 150 may be spaced from one another to provide sufficient flow of concrete between the pipes during forming of the encasing body 120 and also to establish separation to address issues of cross-talk or electrical leakage or arcing between electrical and communication lines in adjacent pipes. In some embodiments, the clear spacing between the pipes may be 1½ inches (measured between pipe outer surfaces). In other embodiments, it may be 3 inches. Lesser or additional clear distance may also be provided, depending on application.

Mating Pipe/Conduit Ends

Figure 2:
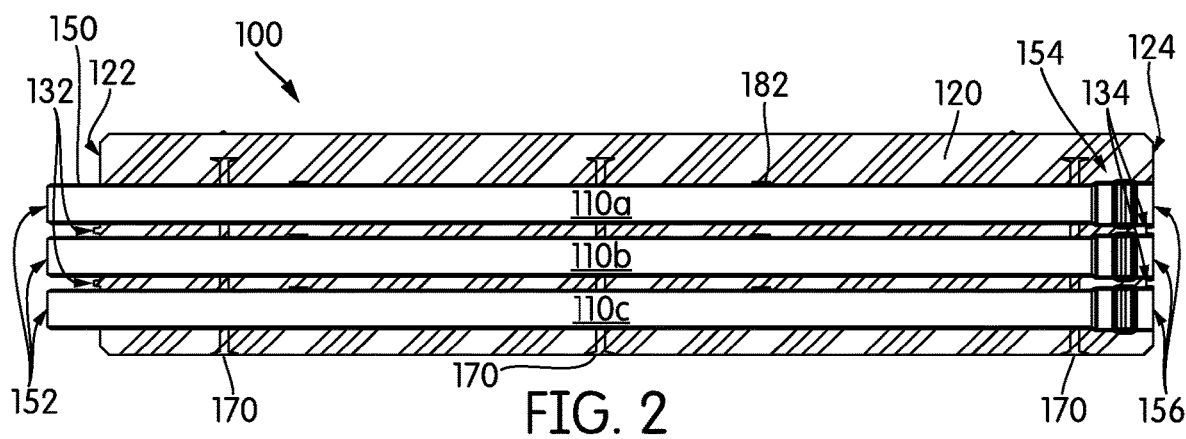
FIG. 2 is a longitudinal, cross-sectional elevation view of the assembly of FIG. 1, taken at the plane indicated by line A-A.

The pipes 150 are provided with male-female mating ends 152, 156 for attachment at the mating ends of adjacent, abutting duct bank assemblies 100. The male-female 152, 156 ends are configured such that when corresponding male and female matings of abutting duct bank assemblies are joined, a self-locking, self-sealing joint is formed. Generally, the encased pipes 150 have a bell 154 formed on one end 156 (see bell ends 154 shown in FIGS. 2, 5, and 7B) and may extend from the encasing material on the other end 152. Accordingly, the encased pipes 150 may be referred to as having a male, or extended end 152, and a female, or belled end 156. As seen in FIG. 2, the precast encasement 120 may be provided around the pipes 150 and may be provided in such a way that the belled end 156 of the pipe 150 generally ends at a surface of a first mating end 124 of the precast encasement 120 and the extended end 152 of the pipe generally ends a distance beyond a surface of a second mating end 122 of the precast encasement. When two banks 100 are arranged for end-to-end mating, the extended end 152 of a pipe 150 of a first bank may be positioned in a belled end 156 of a pipe of an adjacent bank 100, thereby inserted beyond the surface of the precast encasement 120 of the adjacent bank 100, thus allowing the end surfaces of the precast encasement 120 of adjacent banks 100 to abut one another.

Figure 18:
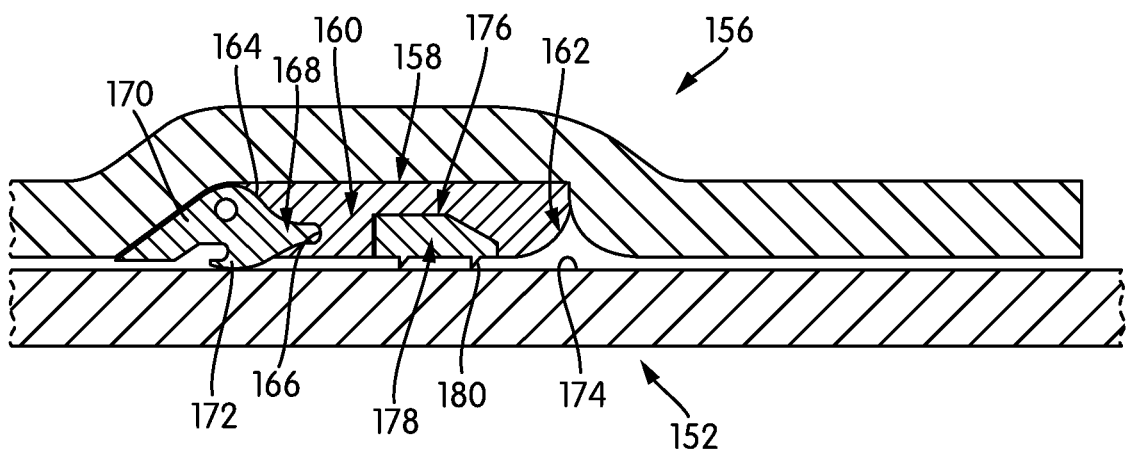
FIG. 18 is a side, quarter cross sectional view of a self-locking, self-sealing conduit joint according to certain embodiments.

In one embodiment, the belled end has a joint restraining system as illustrated in FIG. 18. FIG. 18 is a quarter sectional view of the belled pipe end 156 showing the internal components of a joining system that provides a self-sealing, self-locking joint, also showing the insertion of the mating male pipe end 152. When the male pipe end 152 is inserted within belled pipe end 156, the pipe end 152 extends into the belled end 156 past an interior circumferential recess 158 formed in the belled pipe end 156. Positioned within the recess 158 is a casing member 160. The ring shaped casing member 160 has a leading edge 162 and a trailing edge 164. The trailing edge 164 is preferably provided with a concave shaped profile 166 which receives a leading nose portion 168 of the sealing element 170 to further secure the sealing element within the circumferential recess 158 provided in the belled pipe end. The leading edge 162 of the casing member 160 is also preferably provided with a profile which engages a corresponding surface provided within the recess 158.

While the sealing element 170 can assume a number of forms, it will typically be installed within the circumferential recess 158 of the belled pipe end rearwardly of the ring shaped casing member 160 and of the mouth opening of the belled end 156. In the particular embodiment illustrated in FIG. 18, the elastomeric sealing gasket 170 has a downwardly extending sealing lip 172 which is contacted by the exterior surface 174 of the mating male plastic pipe 152 during the assembly of the joint. Thus, with the sealing element illustrated in FIG. 18, the outer circumferential region of the gasket forms a seal with the interior surface of the belled pipe end and the inner circumferential region forms a sealing surface for the exterior surface of the mating male pipe section.

Positioned between the leading edge 162 and the trailing edge 164, the ring shaped casing member 160 has an inner circumferential surface groove 176 formed at an inner circumferential location of the casing member. The groove 176 is formed to receive a restraining member 178 having one or more circumferential protrusions 180 extending inwardly toward and engaging the outer surface of the male pipe end 152. The protrusions 189 engage the outer surface of the male end 152, such that after insertion of the male end 152 into the belled end 156, movement of the male end out of the belled end is restrained. In a preferred embodiment the restraining member self-engages the male end 152 to lock the joint, and the sealing element provides a watertight seal.

The restraining member 178 may be formed of any suitable material such as metal, and the material used to make the ring shaped casing member 160 can be metal or of various plastics, i.e., Nylon, ABS, PVC. The materials can be chosen depending upon the desired restraining performance, but will have a modulus and tensile strength equal or greater than that of rigid PVC in the preferred embodiment (7,000 psi and 400,000 psi respectively). The ring shaped casing member and the adjacent sealing elastomeric gasket member are preferably integrated with the female bell end during the manufacturing process, per the Rieber belling process, which will be familiar to those skilled in the relevant industry. A suitable self-sealing, self-locking joint system for use in the present invention is commercially available under the marks Can-Grip® and Can-Loc® from Cantex, Inc. Ft. Worth, Tex. Other self-locking, self-sealing conduit joints may be found described in U.S. Pat. Nos. 7,097,211 and 7,845,686, the entire disclosures of which are incorporated herein by reference.

Shear Transfer Mechanisms

Figure 3:
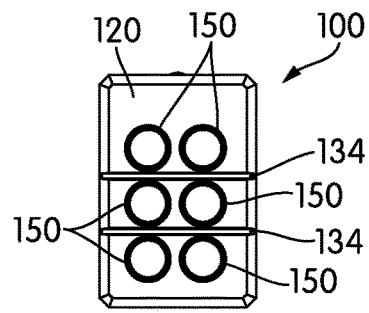
FIG. 3 is a left end view of the assembly of FIG. 1.

The encasements 120 of the duct bank assemblies 100 may have first and second mating ends 122 and 124, corresponding generally to the male 152 and female 156 ends of the pipe 150. Each mating end 122, 124 may include a shear transfer mechanism or structure. This is to keep adjacent, mated ends in stable connection when a shear load is applied, for example by shifts in surrounding soil or fill or a temporary load of a vehicle passing over. That is, for example, as shown in FIGS. 1-3, the male end 122 of an encasement 120 may include one or more shear keys 132 and the female end 124 of an adjacent encasement may include one or more mating keyways 134. (It is noted that the shear key 132 also may be on the female end and the mating keyway 134 may be on the male end.) When two assemblies 100 are arranged end-to-end, the shear key 132 on one mating end of an encasement 120 of a first assembly may engage the keyway 134 on the corresponding mating end of an encasement of an adjacent assembly. The duct bank assemblies thus may include shear key and keyway systems to minimize relative vertical motion between adjacent duct bank assemblies. These systems also relieve shear loads that may be applied to the mating ends 152, 156 of pipes 150 at the plane of abutment.

In some embodiments, the shear key 132 and keyway 134 systems may be designed to carry a differential shear loading equal to an HS-20 axle loading. In some embodiments, the shear key 132 may extend across the end of the duct bank assembly and have a tapered, cross-sectional shape as shown in FIG. 2. For example, the cross-sectional shape of the shear key 132 may be a nominal 1" by 1" square with ⅛" taper on opposed, longitudinal sides to facilitate insertion of the shear key 132 into an adjacent keyway 134. The shear key 132 may be larger or smaller and the size of the shear key 134 may be adjusted and selected based on the load transfer required and the length available for the shear key. In some embodiments, the cross-sectional shape of the shear key may be ½" by ½", 2" by 2", 3" by 3", or some other selected size and the cross-sectional shape may be other than generally square, for example, and may be rectangular, trapezoidal, triangular, semicircular, or some other selected shape. The taper may be greater or less than ⅛" and in some embodiments, a taper may not be provided.

In some embodiments the shear transfer mechanism will be oriented and configured to resist loads other than vertical loads or to resist loads in more than one direction. For example, a shear key structure such as the one described may be provided in the form of a rectangle and may have a shape when viewed from the end of the precast assembly that is like a picture frame-shaped, outwardly-extending rib for example, for mating with a corresponding keyway in the form of a picture frame-shaped recess. In this embodiment, the laterally extending portions may resist differential vertical loads while the vertically extending portions may resist differential lateral loads. In another embodiment, a shear transfer mechanism is formed with generally cylindrical protrusions of one assembly end mating with generally cylindrical recesses of the other assembly end. Other arrangements for transfer of loads in more than one direction may be provided.

While a shear key embodiment has been shown, in some alternative embodiments, a shear resisting structure may include a stair stepped bevel end, precast support foundation, or other foundation between adjoining assemblies. Grouted dowels, embeds with weld plates, or other structures or mechanisms, with static features or moving parts, also may be provided to transfer shear loads at mating assembly ends and resist relative vertical or horizontal motion between abutted assemblies. Various alternative embodiments of shear transfer mechanisms are illustrated in FIGS. 8, 9A-C, 10A-C, 11A-I, 15A-D, 16A-D, and 17 A-D.

Concrete for Encasement; Modular Unit Lengths

The concrete for the encasement may be a 4000 psi concrete with a maximum ¾" aggregate. Other strengths of concrete and aggregate sizes may also be used, depending on application. The precast concrete encasements may be reinforced or unreinforced (e.g., with rebar added) and a variety of additives may be used. For example, additives such as plasticizers, super plasticizers, air entrainment, colorings such as red dyes or other coloring or additives may also be provided. The duct bank assemblies may be made as modular units with a range in length from approximately 2 foot length to approximately 60 feet long or longer. In other embodiments, approximately 4 foot length to approximately 10 foot lengths may be provided. In still other embodiments 20 foot lengths of duct bank assemblies may be provided. Other lengths of duct bank assemblies may be provided, depending on application. One or more lifting loops or hooks may be provided to aid in lifting and placing the modular units.

As shown schematically in FIGS. 8, 9A-C, 10A-C, 11A-I, 15A-D, 16A-D, and 17 A-D, several different, predefined arrays of pipes may be provided within an encasement 120, ranging from 1×1 (single pipe) to 4×4 (sixteen pipes in a square array (viewed from ends)). In alternative embodiments, other larger or smaller arrays may be provided within the encasement 120. The array, the spacing and clearances between the pipes 150, and the exterior concrete cover may define the overall geometry and size of the duct bank assembly 100. The cross-sectional shape of the duct bank assembly may be substantially square or rectangular or cylindrical, and the forming system may include breakdown forms allowing for this type of geometry. The duct bank assemblies 100 may be oriented, when viewed from the end, in one of several orientations including on end, on their side, or at some angle in between.

It will be seen that if spacing distances and patterns are uniform for portions of the arrays shown in FIGS. 8, 9A-C, 10A-C, 15A-D, 16A-D, and 17 A-D and shear mechanisms include multiple, standard positions and separations, it will be possible to terminate some conduits of an array and continue others, using fewer conduits, in a duct assembly with a smaller duct array matching a subset of the array that has some conduits terminated. This adds a further degree of flexibility where a run of duct assemblies may carry service delivery media to more than one part of a building (or to one building in a group of buildings) and not all runs of the service delivery media will need to carry all the media, as some runs reach a termination point. Instead of continuing a run with unused conduits, the run may continue with fewer conduits in a smaller duct assembly. This may make a junction vault unnecessary. The module with fewer conduits can simply be mated to the end of a module with more conduits when some conduits reach the entry point for some of the service delivery media.

Manufacture

The encasements 120 of the duct bank assemblies 100 may be precast in a wet-cast process or a dry-cast process. In still other embodiments, the assemblies may be continuously extruded and cut to length. Consideration may be given to the type of shear transfer mechanism when selecting the approach to be used.

Figure 4:
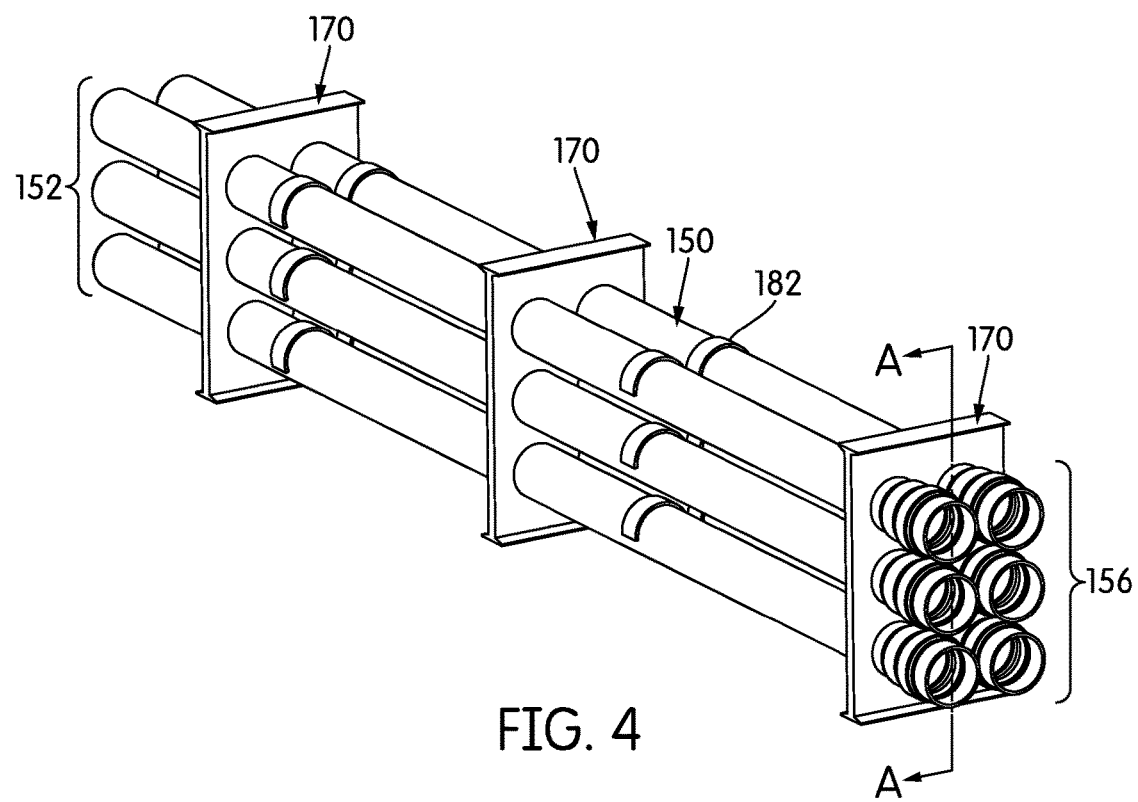
FIG. 4 is perspective view of a preformed duct bank assembly according to certain embodiments, omitting the encasing body and showing the duct spacers and anti-slip collars.
Figure 5:
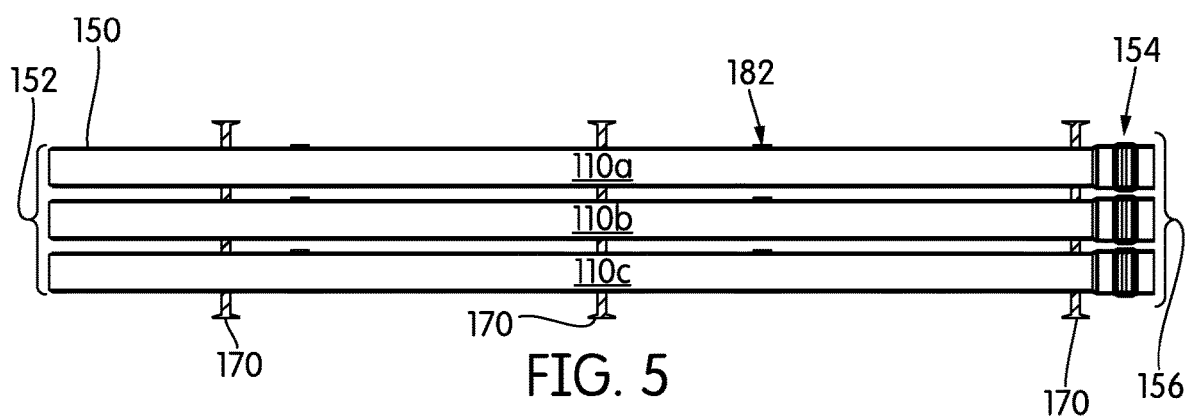
FIG. 5 is a longitudinal cross-sectional view of the assembly of FIG. 4, taken at the plane indicated by line A-A.
Figure 6:
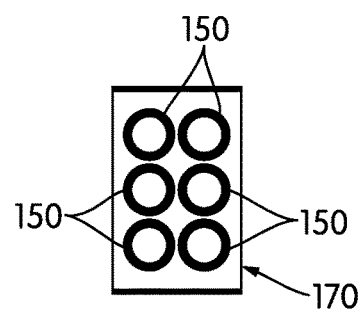
FIG. 6 is a left end elevation view of the assembly of FIG. 4.
Figure 7A:
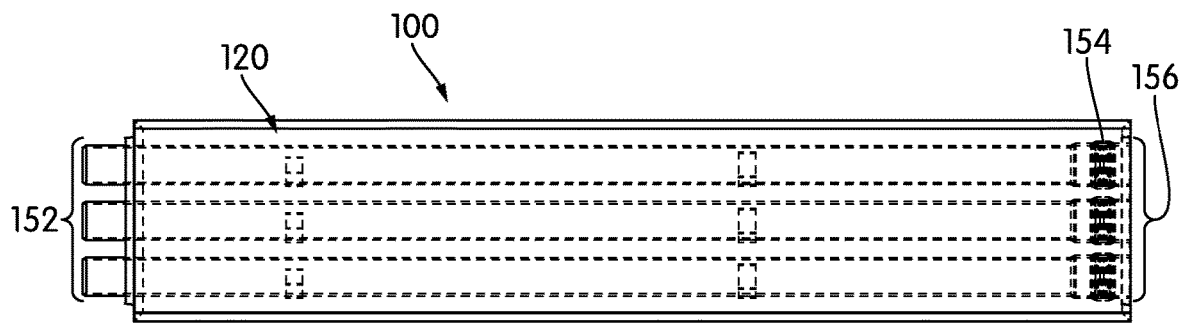
FIGS. 7A, 7B, and 7C are top plan, side elevation, and perspective views, respectively, of a duct bank assembly according to certain embodiments.
Figure 7B:
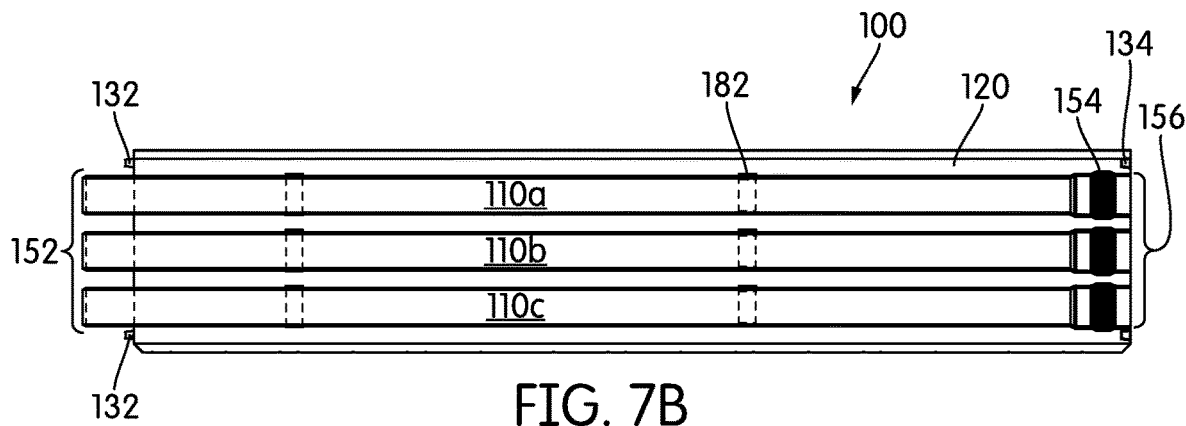
Figure 7C:
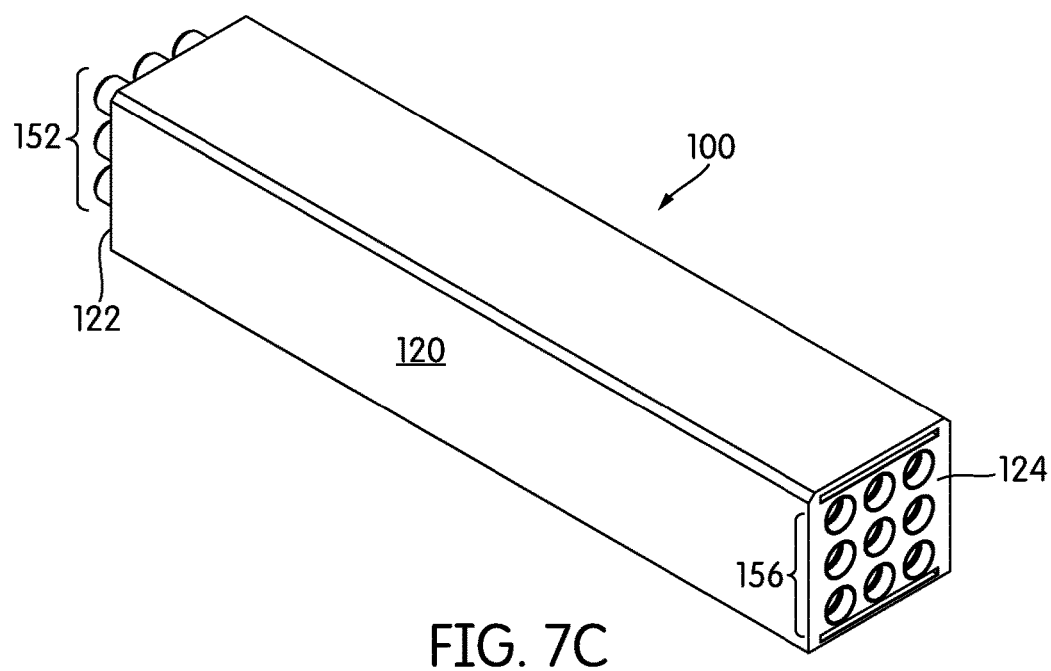
Figure 8:
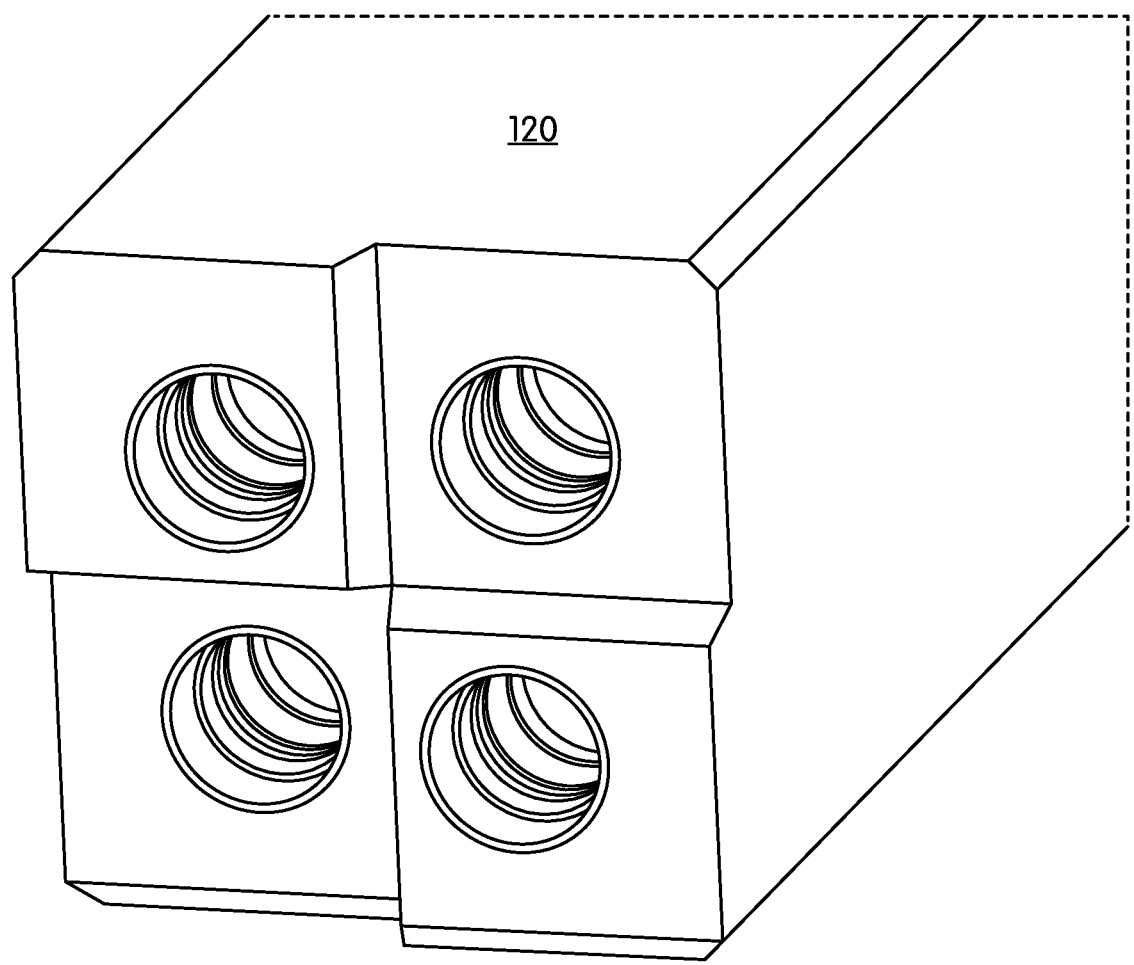
FIG. 8 is an end perspective view of a duct bank assembly according to certain embodiments showing an alternative shear transfer mechanism.
Figure 11A:
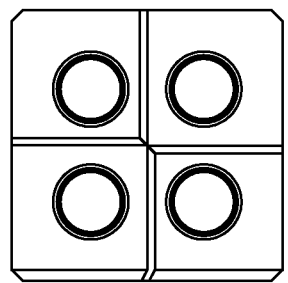
FIGS. 11A, 11B, 11C, 11D, 11E, 11F, 11G, 11H, and 11I are top plan, side elevation, and end perspective views of duct bank assemblies according to certain embodiments.
Figure 11B:
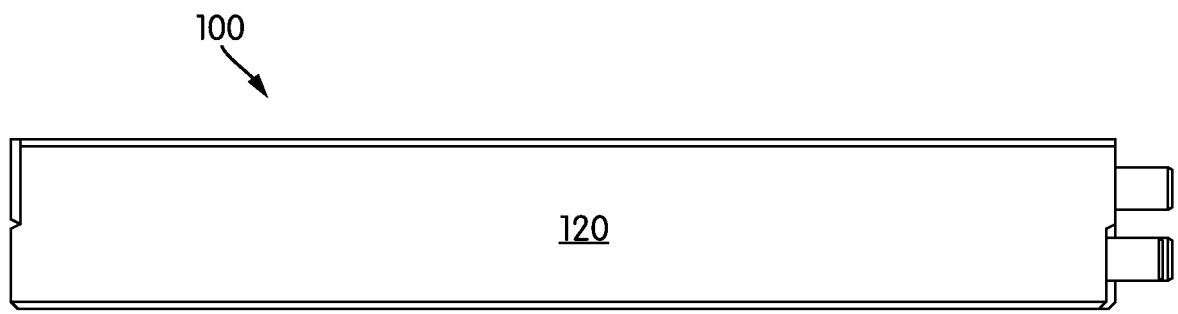
Figure 11C:
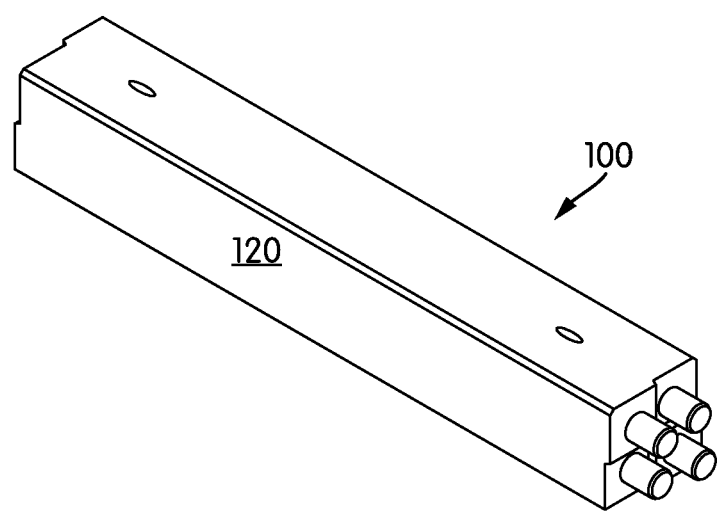
Figure 11D:
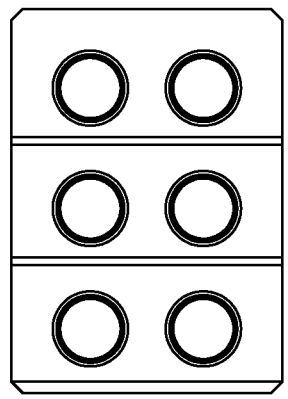
Figure 11E:
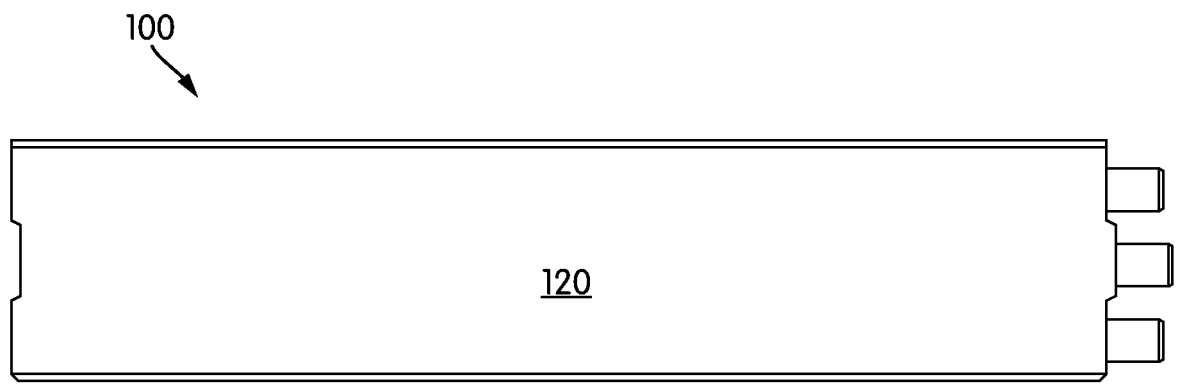
Figure 11F:
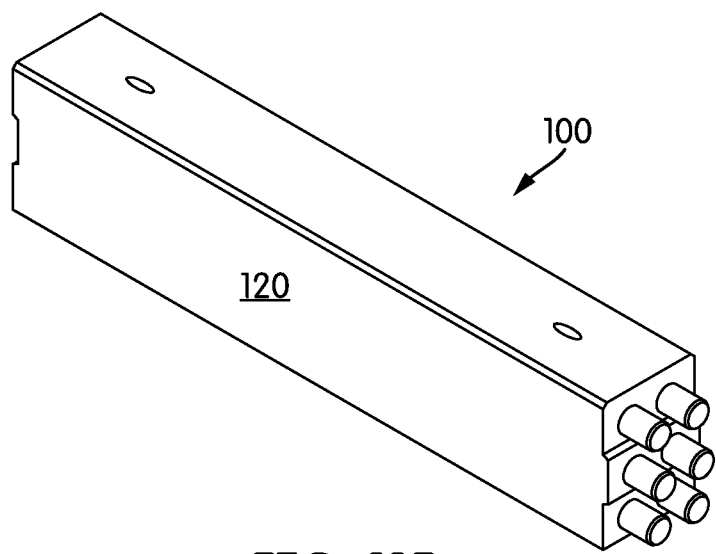
Figure 11G:
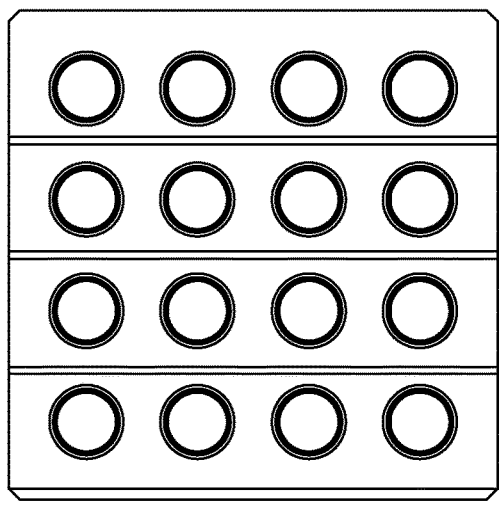
Figure 11H:
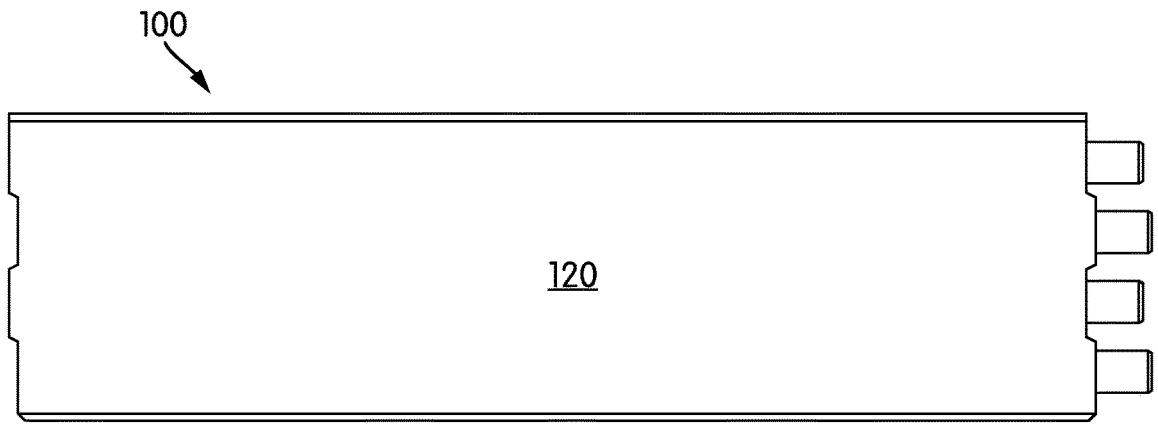
Figure 11I:
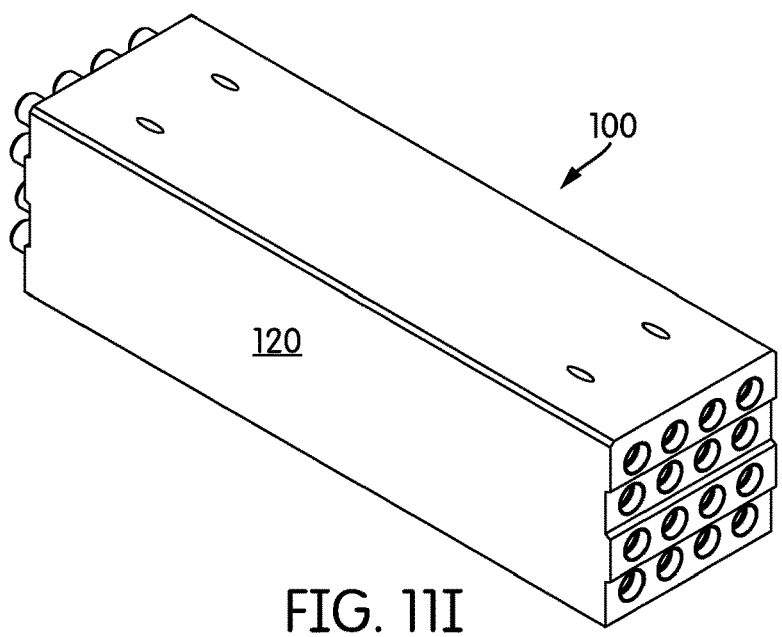
Figure 12A:
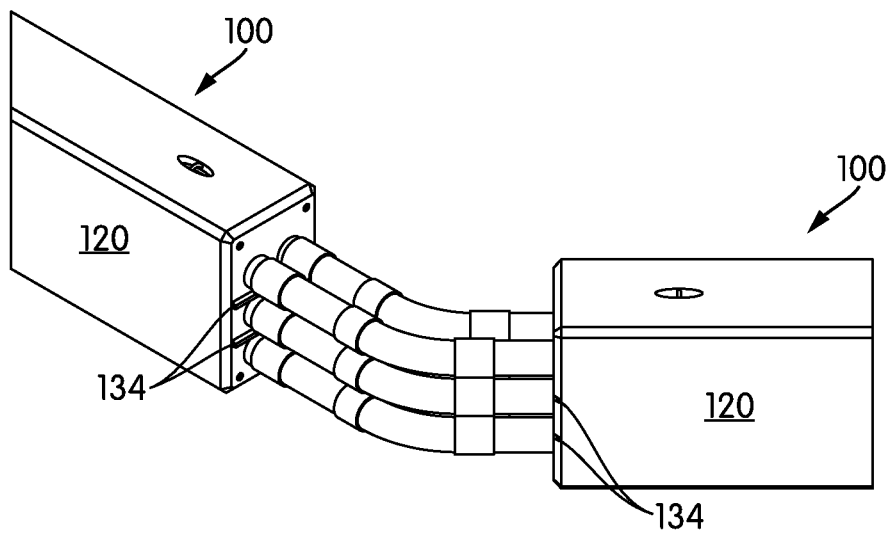
FIGS. 12A and 12B are perspective and plan views of installations of duct bank assemblies of certain embodiments mated to cast-in-place formations.
Figure 12B:
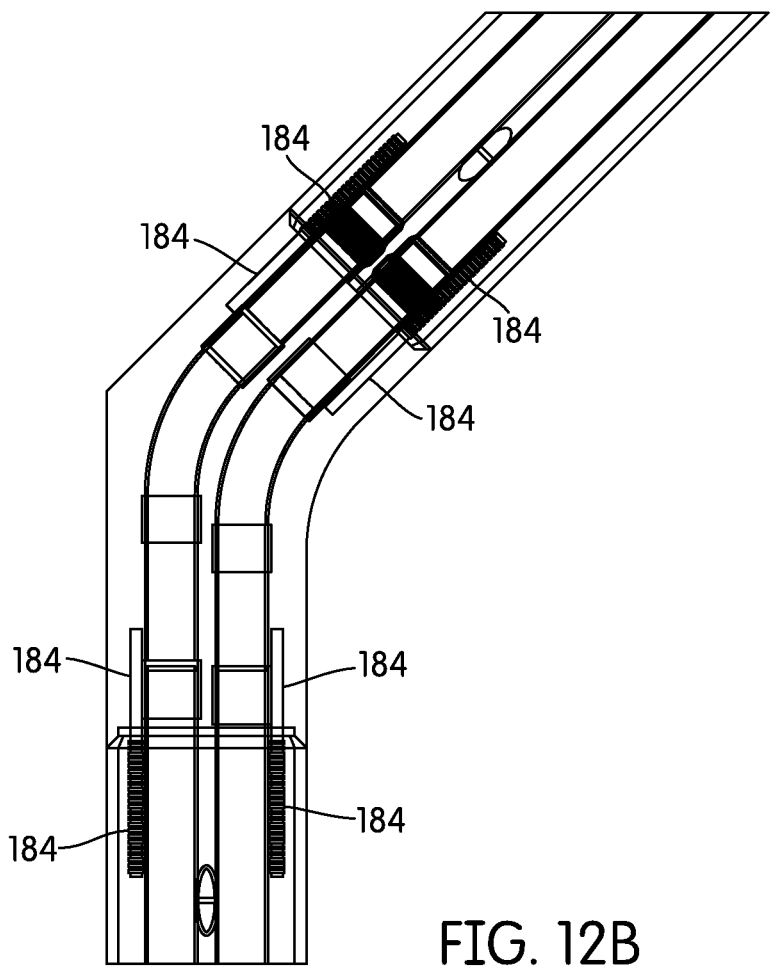
Figure 13A:
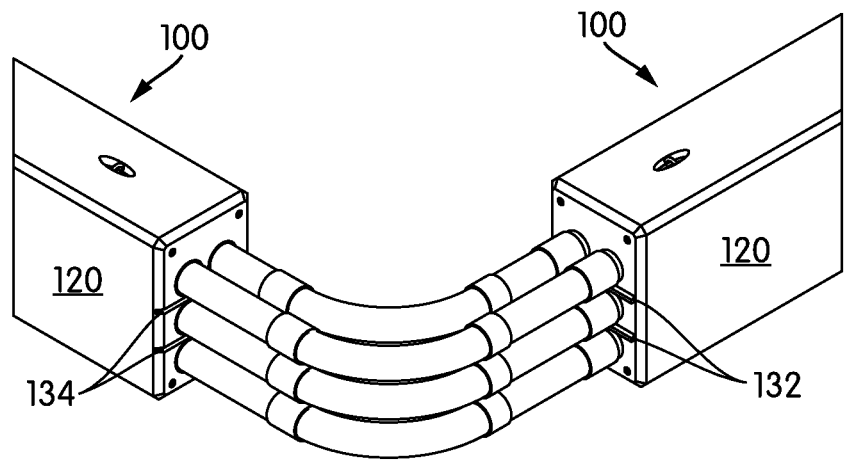
FIGS. 13A and 13B are perspective and plan views of installations of duct bank assemblies of certain embodiments mated to cast-in-place formations.
Figure 13B:
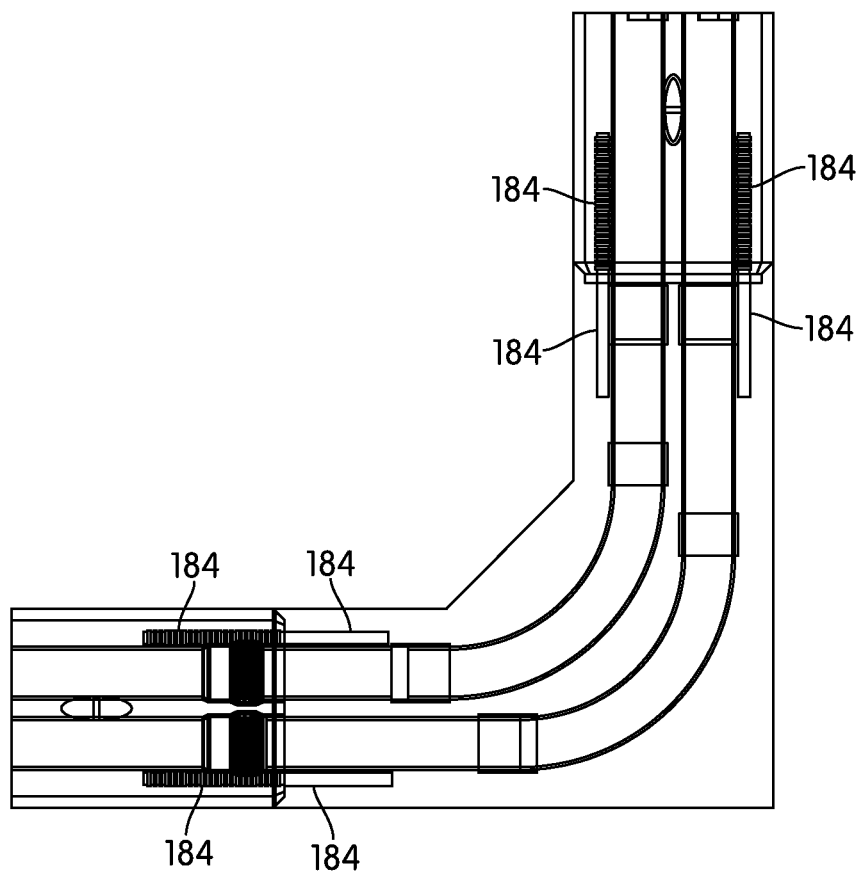
Figure 14:
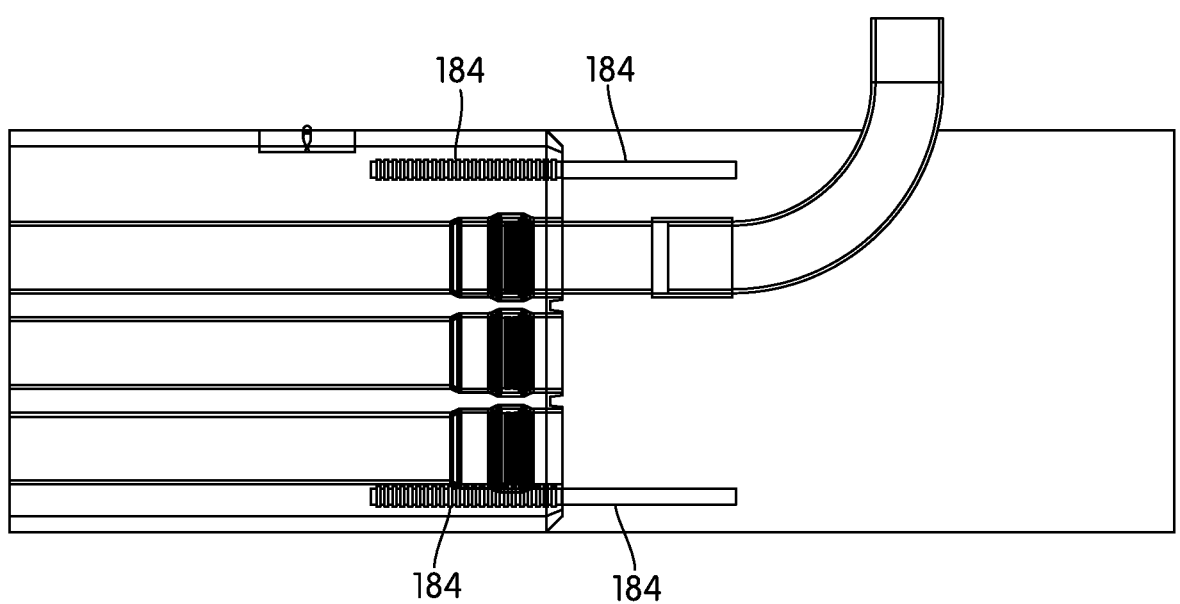
FIG. 14 is a side elevation cutaway view of a certain embodiment of a duct bank assembly mated to a cast-in-place 90-degree vertical conduit bend formation.
Figure 15A:
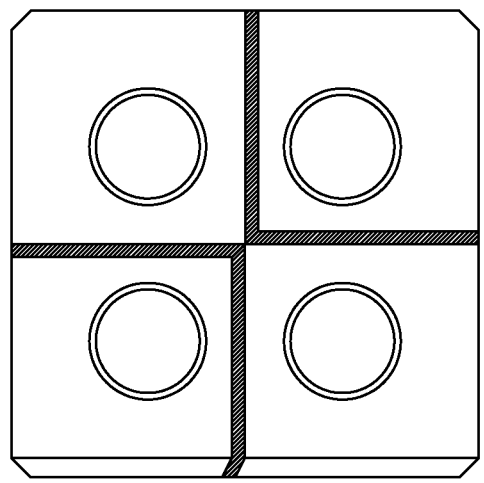
FIGS. 15A, 15B, 15C, and 15D are end elevation, side elevation, and perspective views of duct bank assemblies according to certain embodiments.
Figure 15B:
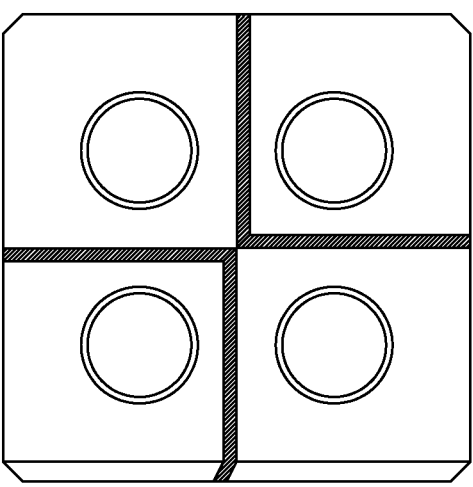
Figure 15C:
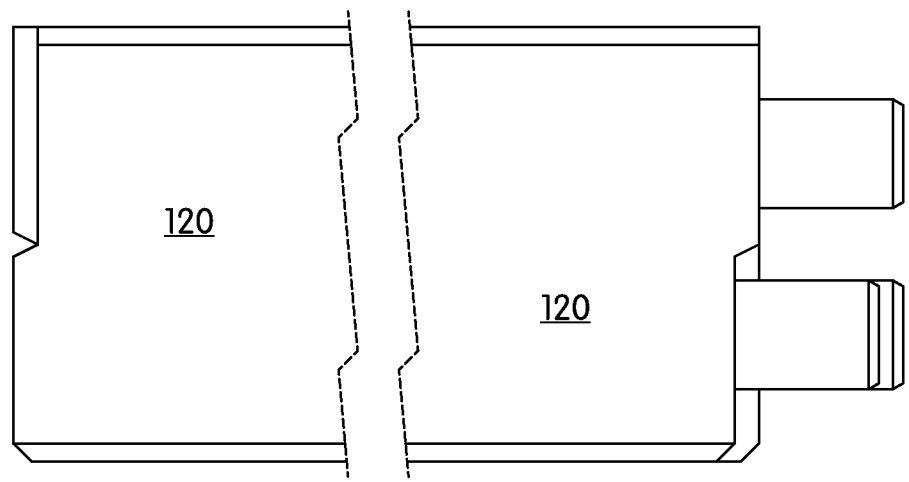
Figure 15D:
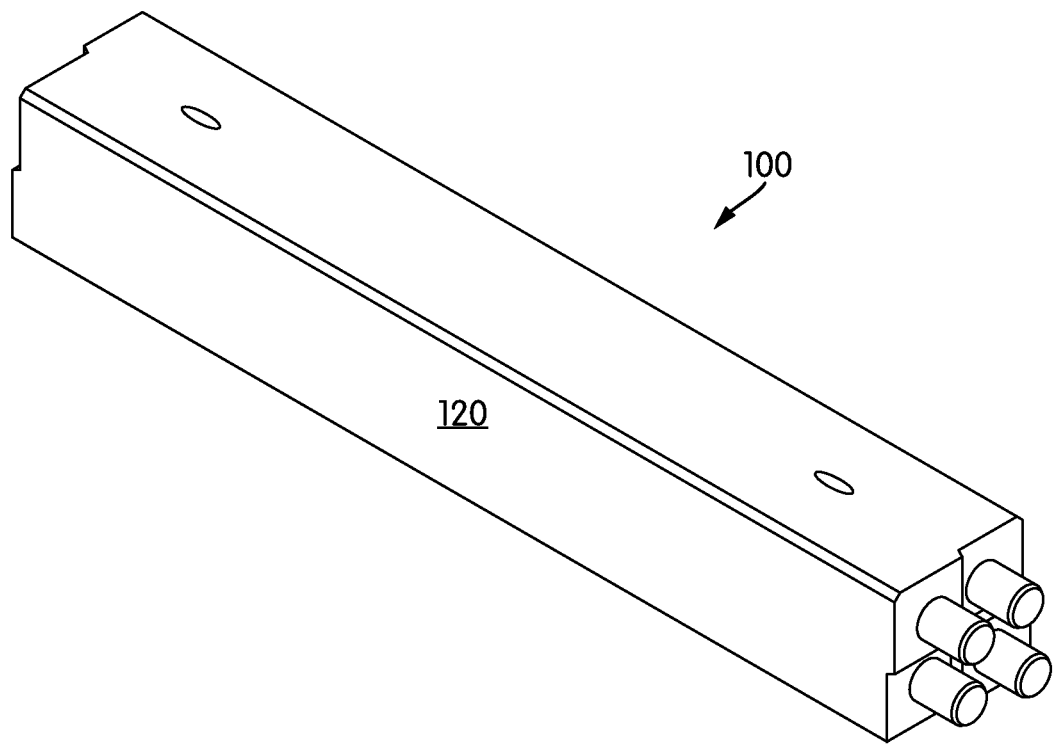
Figure 16A:
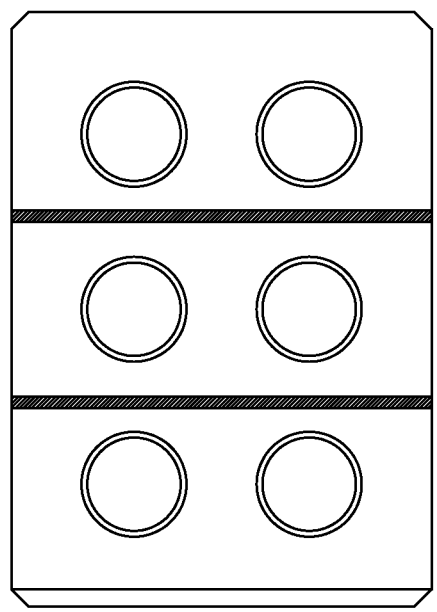
FIGS. 16A, 16B, 16C, and 16D are end elevation, side elevation, and perspective views of duct bank assemblies according to certain embodiments.
Figure 16B:
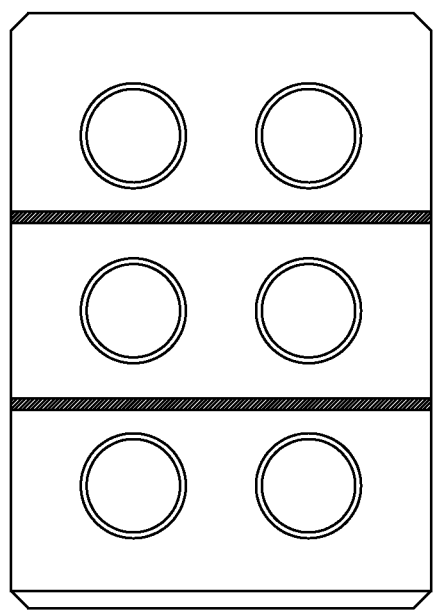
Figure 16C:
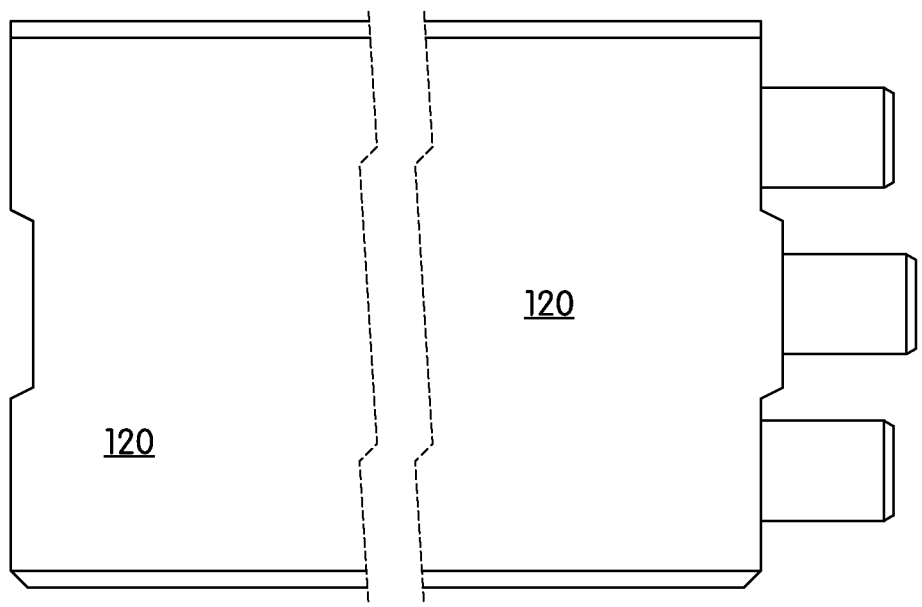
Figure 16D:
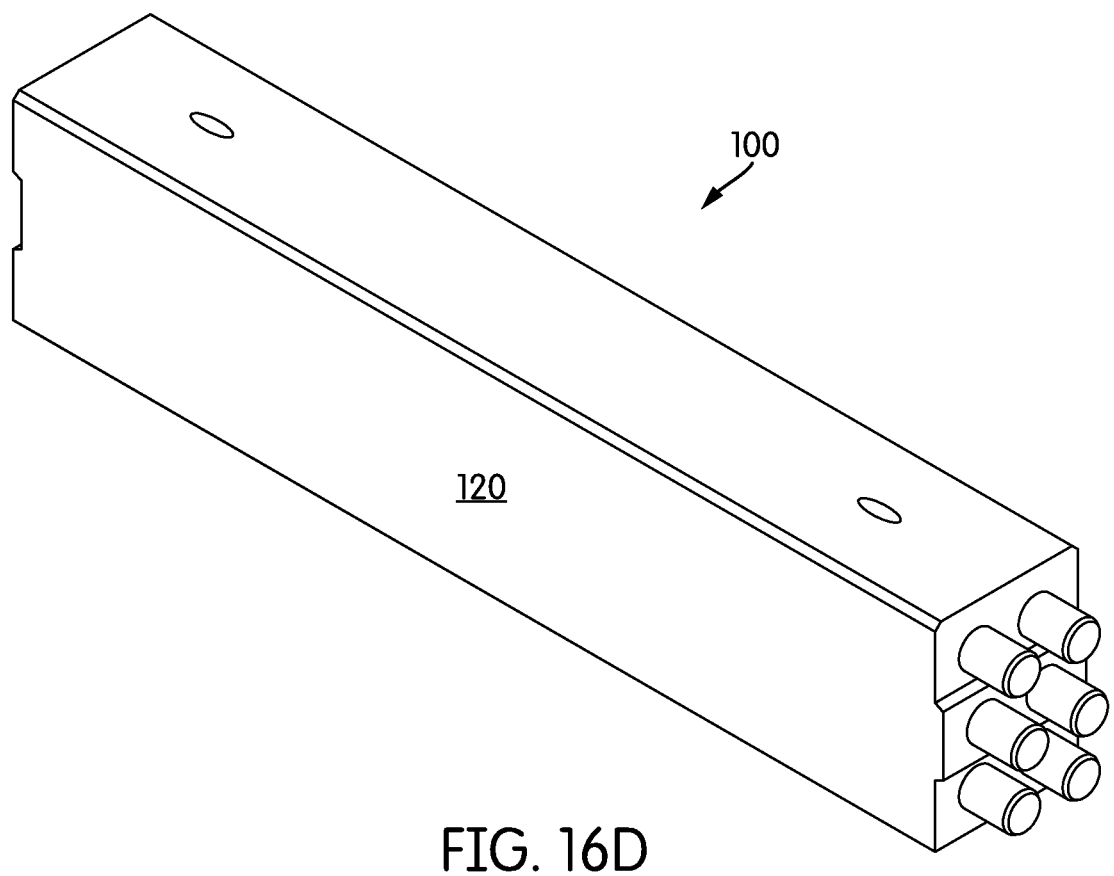
Figure 17A:
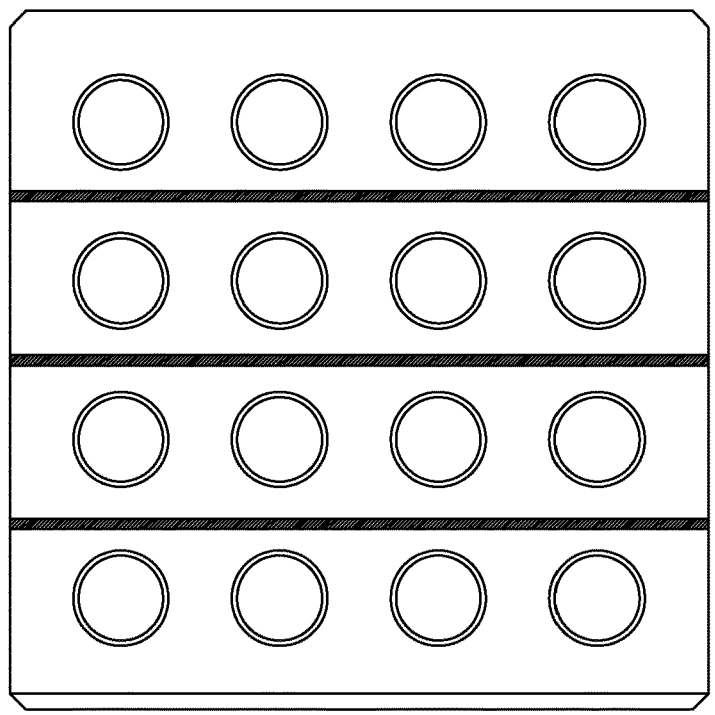
FIGS. 17A, 17B, 17C, and 17D are end elevation, side elevation, and perspective views of duct bank assemblies according to certain embodiments.
Figure 17B:
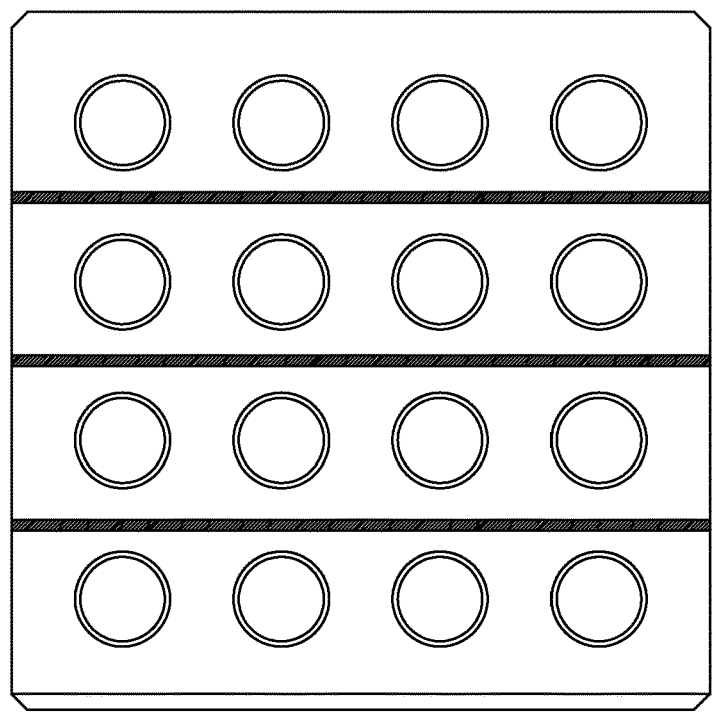
Figure 17C:
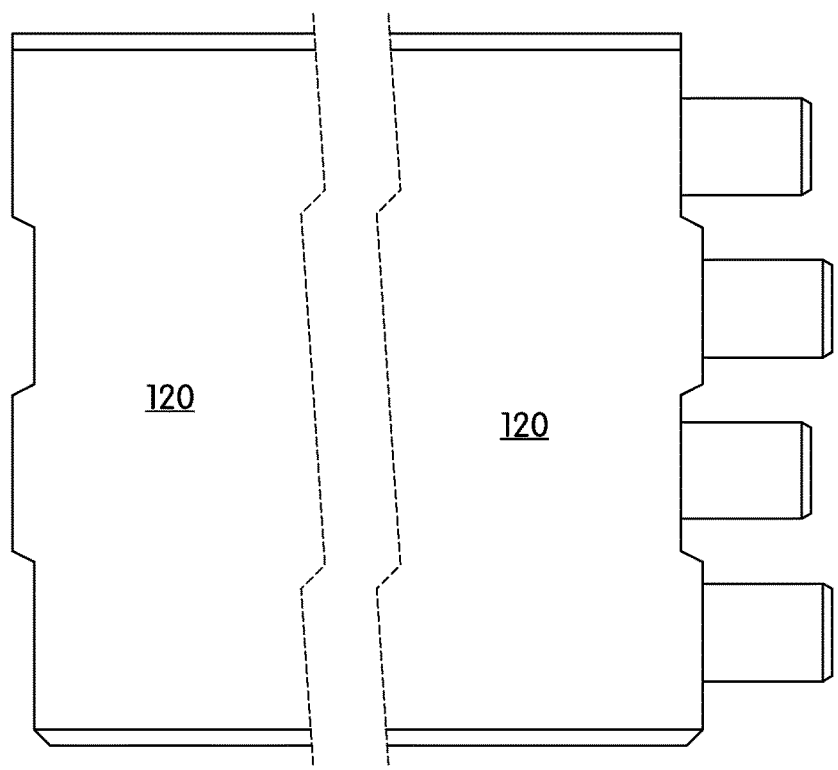
Figure 17D:
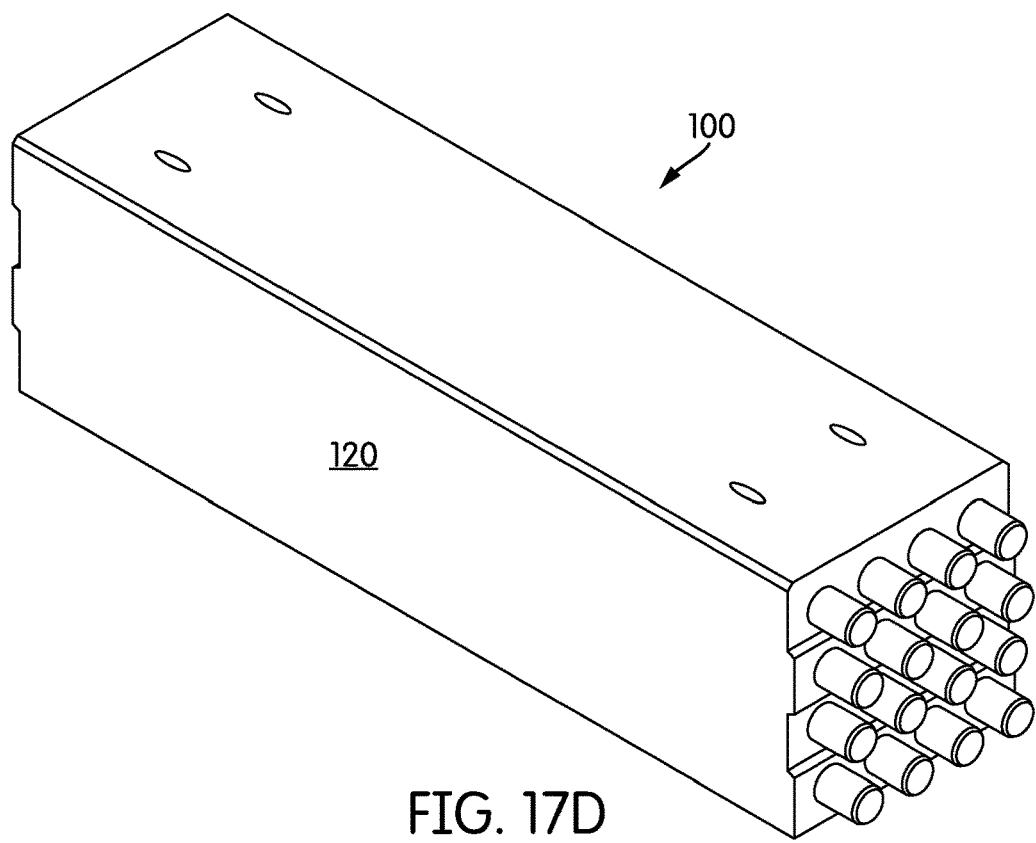

As seen in FIGS. 4-6, a spacer 170 (e.g., a lattice as shown, made of molded or extruded plastic) may be used to support and position pipes during casting. Such spacers are known for use in supporting conduit assemblies and are available from, for example Underground Devices. Incorporated of Northbrook, Ill., which makes a high impact polystyrene spacer. One type of spacers comes in interlocking components, so that rows of adjacent conduits may be supported and additional rows of adjacent conduits may be placed on a row below (Available from TVC Communications). Thus, such spacers can be placed to position pipes/conduits so as to achieve a predefined geometry and placement, such as those seen schematically in FIGS. 8, 9A-C, 10A-C, 11A-I, 15A-D, 16A-D, and 17 A-D. Spacers 170 with pipe receiving surfaces and openings sized for various pipe diameters may be used to build a supported array of pipes in a particular configuration of separation and positioning, during a pour of concrete and remaining embedded thereafter. The spacers may be used at regular intervals along the length of the supported pipes. In some embodiments, a single planar lattice of spacers near the center of the pour may be used and the bulk head or pour end cap at each end may support the pipe at each end. Alternatively, spacers may be spread out and not built into a single plane, such that the lattice may be seen in an end view of a conduit array, but in a plan view the spacers are seen as appearing at intervals. Given the loading of the poured concrete, spacers can help ensure that the conduits 120 keep linear structure, not bowed downward or titled upward in some portions of the length so as to cause displacement or tilting of extensions 156, or bells 154.

The duct bank assemblies also are provided with at least one means for resisting relative motion between the conduit and the encasing body resulting from differential loading between the conduit and the encasing body. As illustrated in FIGS. 2, 4, 5, 7A, and 7B, the conduits are provided with one or more partial circumferential collars 182, which are fixed by adhesion or other fastening means to the conduit sections and extend into the encasement 120 to restrain relative movement of the casing body and the conduit sections in an axial direction (with reference to the conduit sections). While the collars 182 are illustrated in the Figures in an exemplary fashion, further alternative means for resisting relative motion can be envisaged, such as blocks, pins, rings, or other protruding shapes extending into the casing body 120.

Use

The fabrication of the assemblies 100 may be done at a precast assembly plant using side forms and end forms (not shown) and the finished assemblies then shipped to a project site. The assemblies may then be lifted and set into an excavation and positioned end-to-end with additional assemblies to form a series of duct banks. The series of banks may extend generally horizontally and generally straight from beginning to end of the desired passage. In other embodiments, the end faces of adjacent banks may be sloped to accommodate vertical alignment changes or horizontal alignment changes, where the passage must change direction. Several lengths of banks may be provided to extend from a beginning of a duct run to the end of a duct run. Adjusted length banks may be used to accommodate run lengths not divisible by the basic modular duct length used to form the run. In other embodiments, cast in place concrete may be used to fill the remaining length of the run where the space to be filled to finish the run is less than the length of duct bank being used. In some embodiments, a duct bank run may encounter a corner and the precast duct banks may be run up to each side of the corner and cast in place concrete and conduit segments shaped to make a 90 degree or other passage path turn may be used to form the corner. In other embodiments, radiused precast corners containing the path-turn conduit segments may be provided.

FIGS. 12A through 14 show various installations of precast duct bank assemblies installed with cast in place formations. Additional stability and shear resistance between the precast duct bank assemblies and the abutting cast in place formations is provided by rods extending from the casing body 120 into the cast in place formation. These rods may be in the form of all-thread and may be cast into the casing body or inserted and anchored by adhesion or other means into a drilled hole. The ends extending externally from the casing body are then embedded directly into the cast in place formation.

Once the duct bank assemblies are placed, or during the process of placing the assemblies, electrical lines, communication lines, or other wires, cables, or fiber optics, or other service delivery media may be routed through the series of duct banks (often introduced by pulling long lengths from spools of such media) and protection may be provided by the duct banks. Accordingly, where later excavation is conducted and the duct banks are encountered, severing or otherwise interrupting the encased lines, wires, or cables may be avoided due to the protection afforded by the encasing concrete and conduits. Moreover, the shear transfer mechanisms may resist relative vertical or other motion between the duct assemblies under vehicle loads and thus prevent severing, shearing, or otherwise parting the encased lines, wires, or cables, under vehicle loadings. Electrical power delivery, fluid flow, communication, or other activities may thus be conducted via the lines, wires, cables, pipes or other service delivery media or in the hollow interiors of pipes 150 in the duct banks and interruption of these activities due to damage to the connecting lines may be substantially reduced or avoided.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. For example, while the example of electrical or optical communication lines is discussed above, the conduits 150 also can carry warm or cool air, water or other fluids in flexible or rigid piping introduced in the conduits 150, or conduits 150 may serve directly as the transport paths, if equipped with suitably tight sealing at the joining of extensions 156 with bells 154. The form described is merely explanatory, and it is the intention of the following claims to encompass and include such changes.

While the present disclosure has been described with reference to various embodiments, including preferred embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A preformed duct bank assembly module for placement in underground service, comprising:
at least one elongate conduit with a length for receiving and passing through a service delivery media and forming a joint with a corresponding conduit of an abutting, adjacent duct bank assembly module; and
an encasing body formed before module placement and encasing the conduit along its longitudinal extent between a first mating end and an opposed, second mating end of the body, wherein each mating end has a shear transfer mechanism associated therewith for engagement with a corresponding shear transfer mechanism of an adjacent duct bank assembly, said shear transfer mechanism for resisting relative motion between said encasing body and an encasing body of the abutting, adjacent duct bank assemble module resulting from differential shear loading between said encasing body and an encasing body of the abutting, adjacent duct bank assembly module and comprising a shear key that extends across a mating end of the encasing body substantially perpendicular to a longitudinal axis of the longitudinally extending conduit;
wherein each end of the at least one elongate conduit is provided with a male or female mating end for joining with a corresponding male or female mating end of the corresponding conduit of the abutting duct bank assembly in a self-locking, self-sealing joint, the self-locking, self-sealing joint comprising:
a sealing element; and
a restraining member, the restraining member having one or more protrusions for engaging and locking the corresponding mating end.

2. The assembly of claim 1, wherein the female end of the elongate conduit comprises a belled end.

3. The assembly of claim 2, wherein the sealing element comprises a gasket for forming a watertight seal with the inserted male end.

4. The assembly of claim 1, wherein the longitudinal extending conduit comprises a plurality of generally parallel, longitudinally extending conduits in a predefined array.

5. The assembly of claim 4, wherein the encasing body is preformed around the array of conduits, which are arranged on and during pre-forming of the body supported in position within the encasing body by a spacer lattice.

6. The assembly of claim 1, wherein the shear transfer mechanism further comprises a recess at a mating end of the encasing body opposite the shear key to receive the shear key of an abutting, adjacent duct bank assembly.

7. The assembly of claim 1, wherein the encasing body comprises a formable encasing material.

8. The assembly of claim 7, wherein the encasing material comprises precast concrete.

9. The assembly of claim 1, wherein the at least one conduit is an array of conduits that comprises predetermined, uniform separation distances and positions to provide a predefined geometry and placement of the array for abutting, mating ends of adjacent duet bank assembly modules.

10. The assembly of claim 1 wherein the service delivery media is selected from the group consisting of electrical communication lines, optical communication, lines electrical power lines and fluid delivery pipes.

11. The assembly of claim 1 further comprising a grounding wire extending between the first mating end and the second mating end.

12. The assembly of claim 1, further comprising a collar fixed to a portion of the outside circumference of the at least one elongate conduit and extending into the encasing body.

13. A method of making a duct bank assembly module preformed for placement in underground service, comprising:
providing at least one elongate conduit with a length for receiving and passing through a service delivery media and forming a joint with a corresponding conduit of an abutting, adjacent duct bank assembly module;
supporting the conduit at a position suitable for its encasement in the assembly module; and
forming an encasing body before module placement by encasing the conduit along its longitudinal extent between a first mating end and an opposed second mating end of the body, including providing at each mating end a shear transfer mechanism associated therewith for engagement with a corresponding shear transfer mechanism of an adjacent duct bank assembly, said shear transfer mechanism for resisting relative motion between said encasing body and an encasing body of the abutting, adjacent duct bank assembly module resulting from differential shear loading between said encasing body and an encasing body of the abutting, adjacent duct bank assembly module and comprising at least one structure that extends transversely across one of the first and second mating ends for mating with a recess on an abutting, adjacent duct bank assembly;
including providing each end of the at least one elongate conduit with a male or female mating end for joining with a corresponding male or female mating end of the corresponding conduit of the abutting duct bank assembly in a self-locking, self-sealing joint, wherein the self-locking, self-sealing joint comprises a sealing element and a restraining member, the restraining member having one or more protrusions for engaging and locking the corresponding mating end.

14. The method of claim 13 wherein the at least one conduit comprises a plurality of conduits and the step of supporting comprises placing spacers that position and space the plurality of conduits in a predefined pattern.

15. The method of claim 13 wherein the step of providing at least one elongate conduit comprises providing at least one elongate conduit with a belled end for receiving a mating extension of a conduit of an abutting, adjacent duct back assembly.

16. The method of claim 15, wherein the sealing element comprises a gasket for forming a watertight seal with the inserted male end.

17. The method of claim 13, wherein the at least one elongate conduit is an array of conduits that comprises predetermined, uniform separation distances and positions for a predefined geometry of the array at module ends and further comprising placing abutting, mating ends of adjacent duct bank assembly modules by aligning for connection the predefined conduit array geometry of the mating ends.

18. A preformed duct bank assembly module for placement in underground service, comprising:
at least one elongate conduit with a length for receiving and passing through a service delivery media and forming a joint with a corresponding conduit of an abutting, adjacent duct bank assembly module; and
an encasing body formed before module placement and encasing the conduit along its longitudinal extent between a first mating end and an opposed, second mating end of the body, wherein each mating end has a shear transfer mechanism associated therewith for engagement with a corresponding shear transfer mechanism of an adjacent duct bank assembly, said shear transfer mechanism for resisting relative motion between said encasing body and an encasing body of the abutting, adjacent duct bank assemble module resulting from differential shear loading between said encasing body and an encasing body of the abutting, adjacent duct bank assembly module and comprising a picture frame-shaped, outwardly-extending rib with laterally extending portions to resist differential vertical loads and vertically extending portions to resist differential lateral loads;
wherein each end of the at least one elongate conduit is provided with a male or female mating end for joining with a corresponding male or female mating end of the corresponding conduit of the abutting duct bank assembly in a self-locking, self-sealing joint, the self-locking, self-sealing joint comprising:
a sealing element; and
a restraining member, the restraining member having one or more protrusions for engaging and locking the corresponding mating end.

19. The assembly of claim 18, wherein the female end of the elongate conduit comprises a belled end.

20. The assembly of claim 19 wherein the sealing element comprises a gasket for forming a watertight seal with the inserted male end.

21. The assembly of claim 18, wherein the longitudinal extending conduit comprises a plurality of generally parallel, longitudinally extending conduits in a predefined array.

22. The assembly of claim 21, wherein the encasing body is preformed around the array of conduits, which are arranged on and during pre-forming of the body supported in position within the encasing body by a spacer lattice.

23. The assembly of claim 18, wherein the shear transfer mechanism further comprises a recess at a mating end of the encasing body opposite the shear key to receive the shear key of an abutting, adjacent duct bank assembly.

24. The assembly of claim 18, wherein the encasing body comprises a formable encasing material.

25. The assembly of claim 24, wherein the encasing material comprises precast concrete.

26. The assembly of claim 18, wherein the at least one conduit is an array of conduits that comprises predetermined, uniform separation distances and positions to provide a predefined geometry and placement of the array for abutting, mating ends of adjacent duet bank assembly modules.

27. The assembly of claim 18 wherein the service delivery media is selected from the group consisting of electrical communication lines, optical communication, lines electrical power lines and fluid delivery pipes.

28. The assembly of claim 18 further comprising a grounding wire extending between the first mating end and the second mating end.

29. The assembly of claim 18, further comprising a collar fixed to a portion of the outside circumference of the at least one elongate conduit and extending into the encasing body.

* * * * *